United States Patent
Li et al.

(10) Patent No.: US 9,168,691 B2
(45) Date of Patent: Oct. 27, 2015

(54) DEVICE FOR FIBER EXCESS LENGTH STABLE CONTROL IN OPTICAL CABLE LOOSE TUBE

(71) Applicant: YANGZHOU JINSEN OPTOELECTRONICS CO., LTD., Jiangsu Province (CN)

(72) Inventors: Zhaoshun Li, Jiangsu Province (CN); Jun Wang, Jiangsu Province (CN)

(73) Assignee: Yangzhou Jinsen Optoelectronics Co., Ltd (CN)

( * ) Notice: Subject to any disclaimer, the term of this patent is extended or adjusted under 35 U.S.C. 154(b) by 0 days.

(21) Appl. No.: 14/085,059

(22) Filed: Nov. 20, 2013

(65) Prior Publication Data
US 2014/0193539 A1    Jul. 10, 2014

(30) Foreign Application Priority Data
Jan. 5, 2013    (CN) .......................... 2013 1 0001795

(51) Int. Cl.
*B29C 47/34*    (2006.01)
*B29C 47/88*    (2006.01)
*G02B 6/44*    (2006.01)
*B29C 47/00*    (2006.01)

(52) U.S. Cl.
CPC ............... *B29C 47/34* (2013.01); *B29C 47/882* (2013.01); *B29C 47/8835* (2013.01); *G02B 6/4484* (2013.01); *B29C 47/0014* (2013.01); *B29C 47/0057* (2013.01)

(58) Field of Classification Search
CPC    B29C 47/0014; B29C 47/0057; B29C 47/34; B29C 47/882; B29C 47/8835
USPC .................................................... 425/66, 377
See application file for complete search history.

(56) References Cited

U.S. PATENT DOCUMENTS 4,285,899 A * 8/1981 Pavy et al. .................... 264/180

* cited by examiner

*Primary Examiner* — Yogendra Gupta
*Assistant Examiner* — Joseph Leyson
(74) *Attorney, Agent, or Firm* — Zareefa B. Flener; Flener IP Law

(57) ABSTRACT

The present invention relates to a device for fiber excess length stable control in an optical cable loose tube, which is disposed between a loose tube extruder and a loose tube tractor. The device forms the following structures: an extrusion section connected to the extruder, a traction section connected to the tractor, and a transition section connecting the extrusion section and the traction section, where loose tube displacement generated at the extrusion section is greater than loose tube displacement generated at the traction section. The present invention provides a device for fiber excess length stable control in optical cable loose tube with a simple structure and an excellent excess length control effect.

1 Claim, 1 Drawing Sheet

DEVICE FOR FIBER EXCESS LENGTH STABLE CONTROL IN OPTICAL CABLE LOOSE TUBE

BACKGROUND

1. Technical Field

The present invention relates to a device for fiber excess length stable control in an optical cable loose tube.

2. Related Art

The excess length refers to a length difference between an optical cable loose tube and an optical fiber generated as the optical cable loose tube contracts during coating and cooling crystallization. The excess length is one of the problems to be solved during the production of optical fibers and optical cables, and it directly impacts the transmission quality of high-frequency signals in the optical fiber. In the conventional process, a loose tube after secondary optical-fiber coating is cooled in a water trough, and is directly pulled by a tractor to a spool (see FIG. 1). During the cooling of the loose tube, the friction between water and the loose tube material causes an internal stress and a molecule (retraction) tendency in the loose tube, which makes the optical fiber generate excessive length with respect to the loose tube, thus affecting the quality of optical fiber products.

SUMMARY

In view of the above defects, the present invention is directed to a device for fiber excess length stable control in an optical cable loose tube, which has a simple structure and an excellent excess length control effect.

The present invention employs the following technical solution: the present invention is disposed between a loose tube extruder and a loose tube tractor; the device forms the following structures: an extrusion section connected to the extruder, a traction section connected to the tractor, and a transition section connecting the extrusion section and the traction section, where loose tube displacement generated at the extrusion section is greater than loose tube displacement generated at the traction section.

The device has a structure of an inverted-conical taper roller.

The loose tube is wound around the taper roller at least three times from top down.

The present invention has the following advantages: the present invention adds a transitional passive roller, which is tapered and has a greater $\varnothing S_1$ and a smaller $\varnothing S_2$, between the coating of the optical fiber loose tube and the tractor. The loose tube which has been cooled in the water trough is connected into the $S_1$ end; the loose tube is wound at least three times around the taper roller, and cooling water with an appropriate temperature is sprayed over the tube on the roller. The loose tube is connected to the tractor through the $S_2$ end (see FIG. 2 and the top view). According to the kinetic energy theorem, $W=F\times S$, i.e., work=force×displacement in the direction of the force. It is assumed that the upper circumference of the transitional roller is $S_1$, the lower circumference is $S_2$, the pulling force at the $S_1$ end is $F_1$, the pulling force at the $S_2$ end is $F_2$, the work at the $S_1$ end is $W_1$, and the work at the $S_1$ end is $W_2$. As the $W_1$ and $W_2$ are under the effect of the same tractor, the spooler applies the same amount of work at the $S_1$ end and $S_2$ end of the transitional roller, i.e., $W_1=W_2$. $S_1>S_2$, so $F_1<F_2$, and a force difference is generated. Without the device for fiber excess length stable control in an optical cable loose tube, the original force is regarded as $F_1$, and under the effect of the tractor and payoff of the optical fiber, the loose tube contracts while the optical fiber inside the loose tube does not contract, thereby generating excess length. With the device for fiber excess length stable control in an optical cable loose tube, the acting force turns to be $F_2$, and the force against the contraction of the loose tube increases, which offsets the contraction of the loose tube, and no excess length is generated. The sizes of $S_1$, $S_2$, and d and the winding times are changed based on different diameter requirements of loose tubes and different material properties of loose tubes, such as PBT, HDPE, and PP, so as to change the magnitude of $F_2$ to offset the contraction of the loose tube. The problem that the excess length is hard to control is solved by means of a force difference, and the effect is proved to be satisfactory upon process test.

Figure 1:
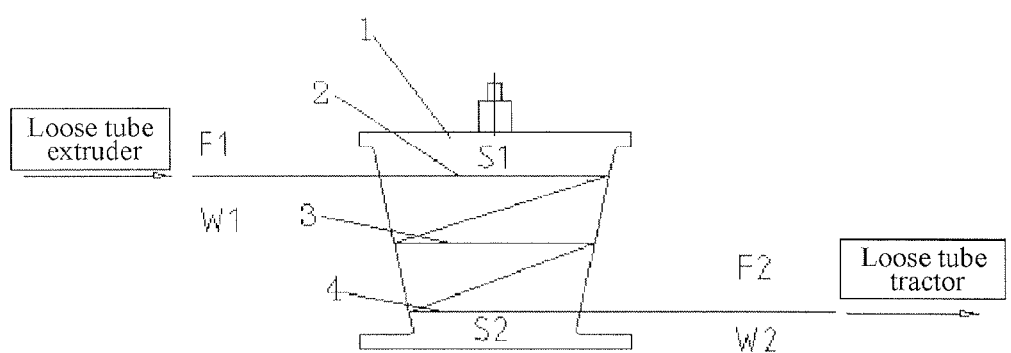
FIG. 1 is a schematic structural view of the present invention.
Figure 2:
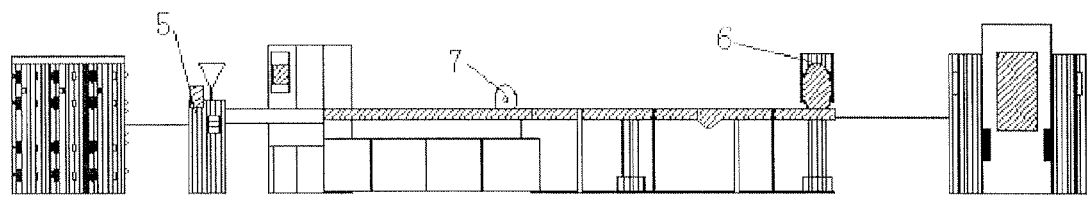
FIG. 2 is an assembly drawing of the present invention.

In the drawings, 1 represents a taper roller, 2 represents an extrusion section, 3 represents a transition section, 4 represents a traction section, 5 represents an extruder, 6 represents a tractor, and 7 represents a cooling water trough.

DETAILED DESCRIPTION

The present invention is disposed between a loose tube extruder 5 and a loose tube tractor 6, and is on the path of a cooling water trough 7. The device forms the following structures: an extrusion section 2 connected to the extruder 5, a traction section 4 connected to the tractor 6, and a transition section 3 connecting the extrusion section 2 and the traction section 4, where loose tube displacement generated at the extrusion section 2 is greater than loose tube displacement generated at the traction section 4.

The device has a structure of an inverted-conical taper roller 1, and the loose tube is wound around a taper roller 1 at least three times from top down.

The drawings show an embodiment of the present invention, which is based on the kinetic energy theorem ($W=F\times S$) in physics. The front and rear ends have the same W, so F of the front end and F of the rear end are controlled through controlling the S of the front and rear ends, and hence the contraction of the loose tube is controlled. The winding manner in the embodiment guarantees a stable force transition during the running of the loose tube, thereby preventing damage on the loose tube resulting from a sudden change of the force.

What is claimed is:

1. A system for stabilizing the fiber length of an optical cable loose tube comprising:
   an extruder for extruding an optical cable loose tube;
   a tractor for pulling an optical cable loose tube;
   a transitional conical shaped passive roller having an extrusion section portion and a tractor section portion,
   wherein the roller is configured to receive and wind an optical cable loose tube containing an optical fiber inside the loose tube at the extrusion section portion from the extruder,
   wherein the extrusion section portion of the roller has a larger diameter than the tractor section portion, and
   wherein the diameter from the extrusion section portion tapers to the smaller diameter at the tractor section portion;
   an optical cable loose tube containing an optical fiber; and a cooling water spray configured to spray water on the optical cable loose tube as it is wound around the roller,
wherein the optical cable loose tube is pulled onto the roller by the tractor and wound around the roller from the extrusion section portion to the tractor section portion,
wherein the water from the water spray cools the optical cable loose tube while it is winding around the roller.

\* \* \* \* \*